US008337289B2

(12) United States Patent
Bartosik

(10) Patent No.: US 8,337,289 B2
(45) Date of Patent: *Dec. 25, 2012

(54) GAMING AND/OR ENTERTAINMENT DEVICE

(75) Inventor: Oliver Bartosik, Guntramsdorf (AT)

(73) Assignee: Novomatic AG, Gumpoldskirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,479

(22) Filed: May 17, 2012

(65) Prior Publication Data

US 2012/0252549 A1 Oct. 4, 2012

Related U.S. Application Data

(63) Continuation of application No. 12/833,774, filed on Jul. 9, 2010, now Pat. No. 8,216,047, which is a continuation of application No. PCT/EP2009/000271, filed on Jan. 16, 2009.

(30) Foreign Application Priority Data

Jan. 18, 2008 (DE) .................... 20 2008 000 756 U

(51) Int. Cl.
*A63F 13/00* (2006.01)

(52) U.S. Cl. ........................................ 463/17; 463/31

(58) Field of Classification Search .................... 463/17, 463/31

See application file for complete search history.

(56) References Cited

U.S. PATENT DOCUMENTS

| | | | |
|---|---|---|---|
| 4,643,425 | A | 2/1987 | Herzenberger |
| 2005/0261048 | A1 | 11/2005 | Evans |
| 2010/0331070 | A1 | 12/2010 | Bartosik |
| 2011/0065513 | A1 | 3/2011 | Nordahl et al. |

FOREIGN PATENT DOCUMENTS

| | | |
|---|---|---|
| DE | 3601631 | 7/1987 |
| DE | 4216442 | 11/1993 |
| DE | 29724009 | 10/1999 |
| JP | 2006-055524 | 3/2006 |
| WO | WO 97/38766 | 10/1997 |
| WO | WO 2006/078219 | 1/2006 |
| WO | WO 2009/080092 | 1/2009 |
| WO | WO 2009/090092 | 7/2009 |

OTHER PUBLICATIONS

International Patent Application No. PCT/EP2009/000271 filed Jan. 16, 2009 in the name of Novomatic AG, International Search Report and Written Opinion mailed Jun. 12, 2009.

*Primary Examiner* — Peter DungBa Vo
*Assistant Examiner* — Jeffrey Wong
(74) *Attorney, Agent, or Firm* — Levine Bagade Han LLP

(57) ABSTRACT

The present invention relates to a gaming and/or entertainment device having a plurality of wager fields which can be covered individually or group-wise by a wager of a player, as well as having a plurality of winning fields of which one or more can be selected by means of a winnings determination means. Bet display means are provided at the winning fields for marking the winning fields which produce a win according to the bets made, with a detection apparatus being associated with the wager fields for the detection of the wager fields respectively covered by a bet and with a control apparatus being provided for the control of the bet display means at the winning fields in dependence on the wager fields covered by bets and detected by the detection apparatus.

20 Claims, 3 Drawing Sheets a)

b)

a) b)

GAMING AND/OR ENTERTAINMENT DEVICE

CROSS-REFERENCE TO RELATED APPLICATIONS

This application is a continuation of U.S. patent application Ser. No. 12/833,774 filed Jul. 9, 2010, which is a continuation of PCT Application No. PCT/EP2009/000271, filed Jan. 16, 2009, which claims priority to German Application No. 20 2008 000 756.9, filed Jan. 18, 2008, all of which are herein incorporated by reference in their entireties.

BACKGROUND (1) Technical Field

The present invention relates to a gaming and/or entertainment device, in particular in the form of a roulette game device, having a game field comprising a plurality of wager fields which can be covered individually and/or group-wise by a wager of a player and/or of a plurality of players, as well as having a playing field, in particular in the form of a roulette wheel, comprising a plurality of winning fields of which one or, optionally, more can be selected by means of a winnings determination means.

(2) Description of the Related Art

In roulette gaming devices which can be made either as mechanical table-top devices with an actually rotating roulette wheel or as electronic gaming machines with screen representations of the game field and of the roulette wheel, as a rule the wager is placed on the game field, for example such that a bet is placed on a specific number, on a specific group of numbers or also on a color, namely black or red. For this purpose, the wagers are placed on the game field in the form of chips with a table-top device and by means of a touch screen or other suitable input means on the screen representation of the game field with an electric roulette gaming machine. Once the bets have been placed, the respective winning field is determined on the playing field, which can take place with mechanical table-top devices by a ball rotating in a circumferential track which falls onto one of the winning fields and with an electronic roulette gaming machine by a random generator by means of which, so-to-say, the rotating ball and its coming to a stop on one of the fields can be virtually modeled.

In such gaming and/or entertainment devices which include a separate game field for the placing of bets and a separate playing field for the determination of a winning field, the game has previously only been able to be followed with increased attention. On the one hand, the rotating roulette wheel or its screen representation must be followed to determine the winning number. On the other hand, the gaze must be directed to the game field in order—in particular with a plurality of covered fields—to remember which game fields were actually covered by a bet. Only by a constant comparison of the covered game fields with the winning field then played allows the monitoring of a win and then also its correct payment.

This constant visual monitoring of both the game field and of the playing field can be fatiguing over time, in particular with larger gaming devices in which it is not possible to keep an eye on both fields simultaneously, since the gaze constantly has to be turned to and fro over a relatively wide range.

SUMMARY OF THE INVENTION

Starting from this, it is the underlying object of the present invention to provide an improved gaming and/or entertainment device which avoids disadvantages of the prior art and further develops the latter in an advantageous manner. A fatigue-free playing should in particular be made possible with a simultaneous continuous monitoring of the course of the game.

This object is solved in accordance with the invention by a gaming and/or entertainment device in accordance with claim 1. Preferred embodiments of the invention are the subject of the dependent claims.

It is therefore proposed to apply markings to the playing field or roulette wheel, to its winning fields, in dependence on the wager fields covered by bets, and indeed to those winning fields which result in a win in accordance with the covered wager fields. In accordance with the invention, bet display means are provided at the winning fields of the playing field for the marking of the winning fields which produce a win according to the bets made, with a detection apparatus being associated with the wager fields for the detection of the wager fields respectively covered by a bet and with a control apparatus being provided for the control of the bet display means at the winning fields in dependence on the wager fields covered by bets and detected by the detection apparatus. If, for example, a player places corresponding chips on the wager fields "1", "7" and "13", this is automatically detected by the detection device. The control apparatus controls the display means provided at the roulette wheel or at its winning fields in dependence on a corresponding signal of the detection apparatus such that the winning fields "1", "7", and "13" are provided with a marking which also shows the player looking at the playing field which winning fields produce a win. Accordingly, the player does not continuously have to turn his gaze to and fro between the game field and the playing field. While a game is running, he can concentrate fully on the playing field and follow the game in a relaxed fashion.

The bet display means can generally have different forms. In accordance with a further development of the invention, the bet display means can preferably include lamps in the form of LEDs which are arranged at the winning fields. The respective winning fields can in this respect be illuminated or provided with an illumination marking. Alternatively or additionally, other optical display means could also be provided, for example, movably arranged markings which can move out or can be moved in another manner. When the playing field is formed in the form of a screen display, the display means can have a changed color representation of the respective winning field or a changed pattern or a differently made marking.

In a simple further development of the invention, the bet display means can include digitally working markings, in particular such that only the covering of a corresponding wager field with a respective winning field is displayed using a yes/no circuit.

In accordance with another advantageous embodiment of the invention, the bet display means can, however, also have a plurality of differently formed marking means and/or can be operated in differently formed display modes. Provision can, for example, be made that lamps lighting in different colors are provided at the winning field. Alternatively or additionally, the display means can flash in the manner of Morse code in different rhythms, frequencies or signal sequences. Alternatively or additionally, differently shaped markings can also be provided, for example in the form of a cross or in the form of a circle.

Different bets can advantageously be displayed differently with such differently formed marking means or display modes. The bets of, for example, two different players can be displayed differently, for example those of a player A in a blue color and those of a player B in a green color. Alternatively or additionally, different wager levels can also be displayed differently, for example such that, with a particularly high wager on a wager field, a red marking is attached to the winning field associated with it, a yellow marking with a moderate wager and a green marking with a low wager. Different types of wagers can likewise be displayed, for example such that, with a group-wise covering of fields, the winning fields associated therewith are displayed by a flashing signal, while a singular covering of an individual wager field is marked by a permanent marking at the corresponding winning field.

Provision is advantageously made in this respect that the detection apparatus has distinguishing means for the distinguishing of the respectively made bet for a wager field by the amount, by the associated player and/or by the type of wager and the control apparatus has switching means for the switching over of the bet display means between the different marking means or the different display modes, in particular such that different markings and/or different display modes are shown in dependence on the type of wager, the amount of the wager or the associated player detected by the distinguishing means.

The gaming or entertainment device can be made as a mechanical table-top device in an advantageously further development of the invention. In this respect, the game field can be arranged on a table or can form its table surface, for example in the form of a felt cover or cloth cover known per se. The detection apparatus associated with the wager fields of the game fields is in this respect advantageously integrated into the table and/or is arranged invisibly beneath the table surface. The detection apparatus can in this respect generally be made differently, for example made to work inductively, capacitively and/or electronically so that the suitably made chips are detected in a corresponding manner when they are placed onto the respective wager fields.

When made as a table-top device, the playing field is advantageously made in a manner known per se as a roulette wheel which is rotatably journal led about a preferably upright axis at the roulette table or at an associated circumferential hall track. The bet display means, for example in the form of LEDs, are in this respect fastened to the rotating roulette wheel, preferably directly in the region and/or in the vicinity of the winning fields attached to the roulette wheel. The energy supply of the display means arranged on the rotating roulette wheel can in this respect take place in different manner; for example, an energy store in the form of a chargeable battery or the like can be fastened to the roulette wheel. Alternatively or additionally, an energy supply can also be provided from the stationary part of the device, for example via sliding contacts at the rotary axle.

In accordance with another advantageous embodiment of the invention, the gaming and/or entertainment device can also be made as an electronic gaming machine with at least one screen on which the game field and the playing field are displayed in the form of screen representations. Two separate screens can advantageously also be provided of which one displays the game field and the other the playing field. With such an electronic screen device, the screen showing the game field or the corresponding screen part can advantageously be made as a touch screen apparatus which allows a covering of the wager fields of the game field with bets by simple touching of the screen surface with a finger or the like. In this respect, the detection apparatus for the detection of the wager fields covered by a bet are advantageously integrated into the touch screen apparatus, with the detection apparatus generally being able to have different forms; for example, a capacitively working detection apparatus can be provided. The detection apparatus can, however, also be made to work optically or electronically. If the playing field is also made in the form of a screen representation, the bet display means can advantageously be integrated into the corresponding screen.

In a further development of the invention, optionally, mixed forms between a mechanical table-top device and an electronically working screen device can also be provided, for example such that the winning field is played by a "real" rotating roulette wheel, while the wager field is displayed on a screen as a screen representation, with a plurality of screens being able to be provided, for example, so that every player or every player group has his or their own game field.

BRIEF DESCRIPTION OF THE DRAWINGS

The invention will be explained in more detail in the following with respect to a preferred embodiment and to associated drawings. There are shown in the drawings.

DETAILED DESCRIPTION

Figure 1:
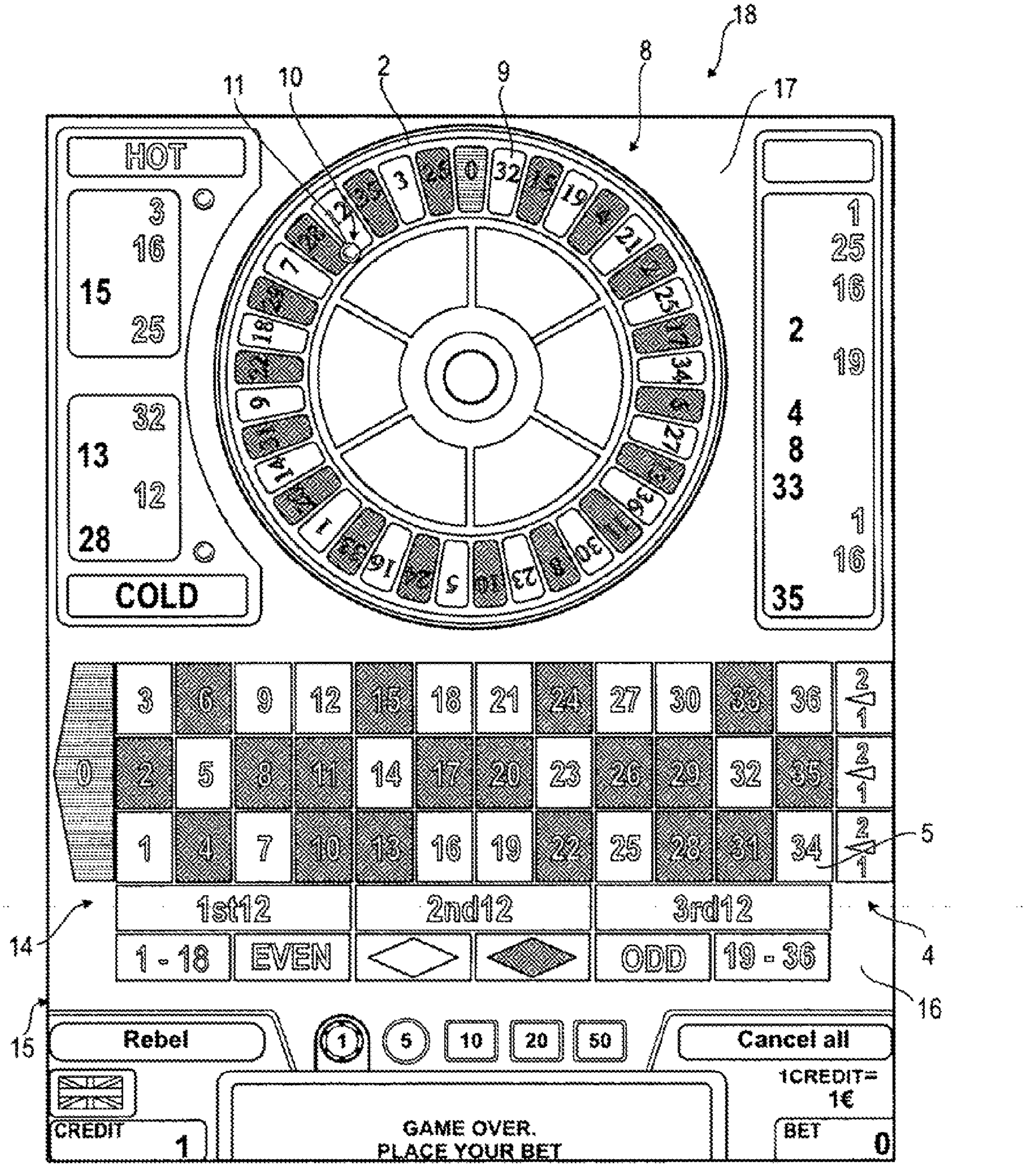
FIG. 1 a plan view of a gaming or entertainment device in the form of a roulette gaming device in accordance with an advantageous embodiment of the invention which shows the game field as well as the playing field formed as the roulette wheel, with still no bets being made on the game field and accordingly no markings yet being provided on the roulette wheel.

The embodiment of a roulette gaming device 1 shown in the Figures is an electronic screen device which can, for example, form a stand-alone device and can include a device housing which is approximately as tall as a man, is roughly speaking of box shape, which has the display apparatus 18 shown in the Figures in its upper half and which accommodates an electronic control apparatus 15, for example with a microprocessor and a random generator, in its interior. It is, however, understood that generally all other device configurations, for example wall-mounted devices, but also mechanically formed table-top devices, can be used.

The display apparatus 18 of the roulette gaming device 1 shown in the Figures in this respect includes a large-area screen 16 on which a game field 4 as well as a playing field 8 are displayed as screen representations and are animated by the control apparatus 15. Instead of a screen 16 showing both fields together, two separate screens 16 and 17 could also be provided of which the one displays the named game field 4 and the other the named playing field 8, wherein in this case the two screens could be inclined at an obtuse angle to one another to improve the view of the two fields.

The named game field 4 in this respect includes a plurality of wager fields 5 which are marked in roulette gaming machines in a manner known per se by the numerals 0 to 36, with additional group game fields being provided by means of which all even or all odd wager fields or all red or black wager fields, etc. can be covered with bets in a simplified manner.

The screen 16 is in this respect advantageously made as a touch screen apparatus so that bets 6 can be placed onto a respective wager field 5 by simple touching of the individual wager fields 5. A detection apparatus 14 which can, for example, work inductively or capacitively and which is arranged beneath the screen surface is advantageously associated with the touch screen apparatus in this respect. It is detected by means of this detection apparatus 14 whether and when a bet 6 is placed on which wager field 5. The amount of the respective bet 6 can in this respect generally be determined in different manners, for example in that first a field characterizing the amount of the bet is touched and then the respective wager field 5 is touched. Alternatively, for example, by multiple touching of the same wager field 5, the wager placed thereon can be increased.

Figure 2:
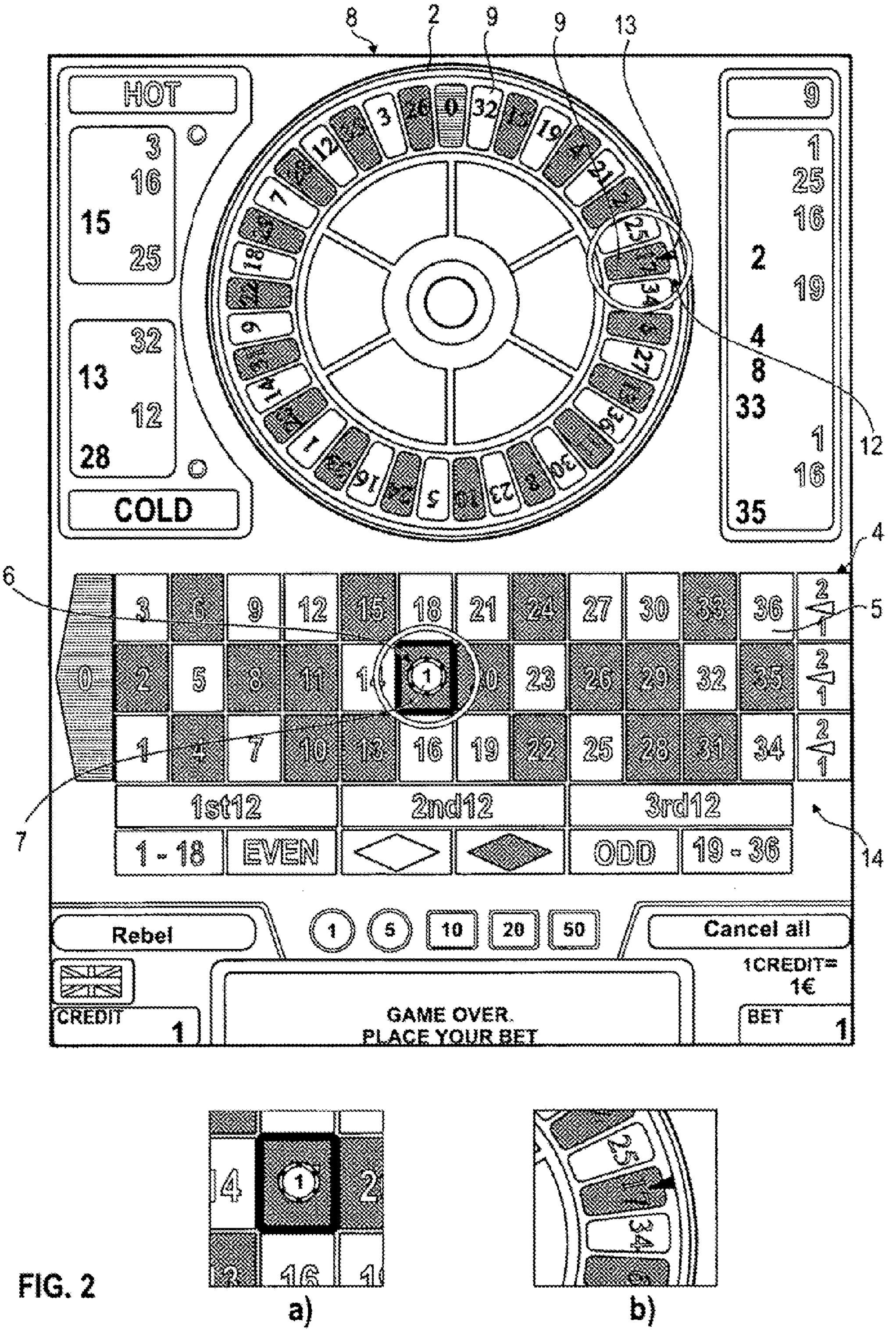
FIG. 2, a plan view of the roulette gaming device of FIG. 1, with a bet being made in the game field on the wager field "17" and accordingly the winning field 17 being provided with a marking, with the enlarged representations (a) and (b) showing the wager field "17" covered by the bet and the winning field 17 provided with the marking.

The control apparatus 15 controlling the screen representation of the game field 4 can advantageously display a bet 6 in the form of corresponding chips placed on the wager field 4, as is shown in FIG. 2. In accordance with the representation of FIG. 2, a bet to the amount of €1.00 was placed on the wager field 5 marked by the number "17" so that the screen representation of the game field 4 shows a chip 7 on the named wager field 5.

In addition, the control apparatus 15 also changes the screen representation of the playing field 8 after a bet 6 on a wager field 5 was detected by the detection apparatus 14. The control apparatus 15 contrast the bet display means 12 associated with the playing field 8 in dependence on a signal of the detection apparatus 14 such that the latter display a marking 13 in the playing field 8, and indeed on the corresponding winning field 9 which is likewise characterized by the number "17" and which corresponds to the corresponding wager field 5 in the game field 4. As FIG. 2 shows, the playing field 8 is advantageously formed in the form of a roulette wheel. In the drawn embodiment, the previously named marking 13 is made in the form of an illuminated arrow in this respect which faces the corresponding winning field 9.

Figure 3:
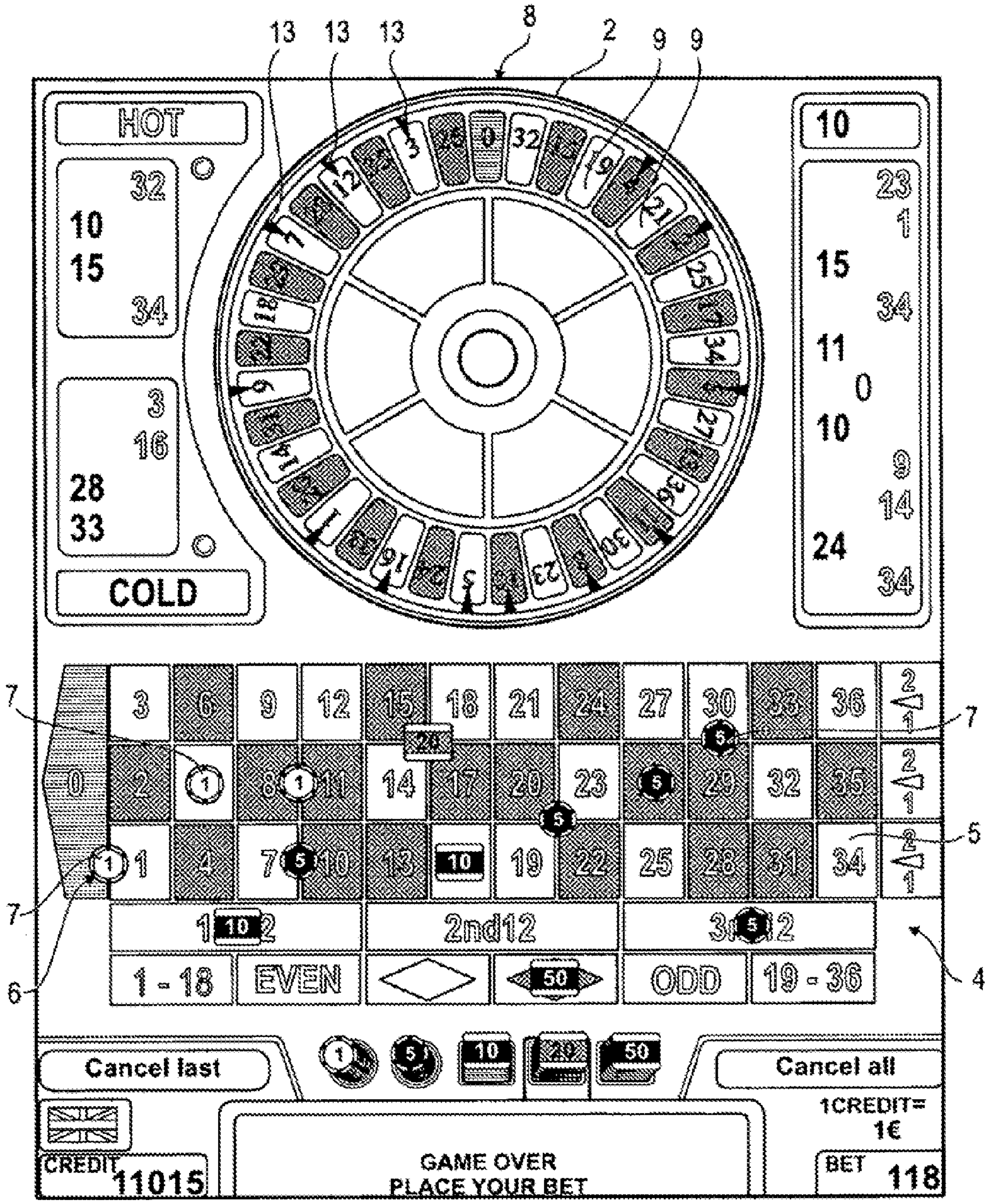
FIG. 3: a plan view of the roulette gaming device from the preceding Figures, with a plurality of wager fields being covered by bets in the game field and accordingly the associated winning fields being provided with markings.

FIG. 3 shows another game state of the roulette gaming device 1 in which a plurality of wager fields 5 were covered by corresponding bets 6 which are displayed in the form of chips 7 on the game field 4. The wager fields 5 covered by bets 6 are detected by the detection apparatus 14 so that the control apparatus 15 can control the bet display means 12 associated with the playing field 8 in dependence on a corresponding signal of the detection apparatus 14 to provide the winning fields 9 with markings 13 which then produce a win in the following roulette game.

The control apparatus 15, the detection apparatus 14 and the bet display means 12 are advantageously made in this respect such that the bets 6 in the form of chips 7 can be pushed so-to-say to and fro over the game field 4 from the one wager field 5 to another wager field 5, in particular in that a finger is moved over the touch screen apparatus. In this respect, it is in each case detected by the detection apparatus 14 in which wager field the bet is actually located. For this purpose, essentially parallel in time, the display means 12 show by means of corresponding markings 13 on the playing field 8 in the form of the roulette wheel in which region of the playing field, i.e. of the roulette wheel, the placed bet is located. Parallel to this, it is also displayed in the game field 4 which wager field 5 was touched so-to-say by the finger, which is realized in the drawn embodiment by a frame highlighting the respective wager field 5. Only when the finger touching the touch screen apparatus has come to a stop and/or is removed from the touch screen is the respective wager field 5 actually covered by a bet 6. The corresponding marking 13 in the playing field 8 remains at the corresponding winning field 9 of the roulette wheel. The highlighting of the wager field 5 in the game field 4 can disappear, in contrast. The representation of the chips 7 remains there.

This displaceability of a bet over the game field 4 and the display at the roulette wheel essentially parallel in time to this makes it possible in a particularly simple manner, also without detailed knowledge of the division of the roulette wheel, to play a specific region or a specific quadrant of the roulette wheel, which substantially simplifies the betting procedure particularly for non-professional games. On the other hand, it is also possible in a substantially easier manner for a player during the then taking place of the winning to monitor whether the played winning field 9 is a field producing a win for him or a field not producing a win for him.

I claim:

1. An entertainment device comprising:

a game field comprising a plurality of wager fields and a playing field, wherein the wager fields are configured to be covered as an individual wager field and/or group of wager fields by a bet of a player or of a plurality of players, and wherein the playing field comprises a plurality of winning fields;

a self-illuminating bet displayer configured to illuminate at least one winning field in response to the detection apparatus detecting a wager field covered by a bet of the playing field for marking;

a detection apparatus for the detection and generation of a signal representative of the individual wager field and/or group of wager fields covered by a bet; and a control apparatus for the control of the bet displayer in dependence on the signal of the detection apparatus.

2. The device of claim 1, wherein the entertainment device comprises a roulette gaming device.

3. The device of claim 2, wherein the playing field comprises a roulette wheel.

4. The device of claim 1, wherein the bet displayer comprises a lamp at the winning fields.

5. The device of claim 4, wherein the lamp comprises an LED.

6. The device of claim 4, wherein the game field is arranged on a table and/or forms a table surface, and wherein the detection apparatus is integrated into the table and/or table surface.

7. The device of claim 4, wherein the playing field comprises a roulette wheel rotatably journalled about an axis at a roulette table and/or at a circumferential ball track, wherein the bet displayer is fastened to the roulette wheel.

8. The device of claim 1, wherein the bet displayer comprises a plurality of differently formed markers and/or is configured to be operated in differently formed display modes.

9. The device of claim 8, wherein the game field is arranged on a table and/or forms a table surface, and wherein the detection apparatus is integrated into the table and/or table surface.

10. The device of claim 1, wherein the detection apparatus comprises a distinguisher for the distinguishing the respective bet placed for a wager field by an amount of the bet and/or by an associated player of the bet and/or by a type of the bet, wherein the control apparatus comprises a display mode controller for the control of the bet displayer such that different markings and/or display modes are shown in dependence on the detected bet amount and/or the detected bet type and/or the player associated with the bet.

11. The device of claim 10, wherein the game field is arranged on a table and/or forms a table surface, and wherein the detection apparatus is integrated into the table and/or table surface.

12. The device of claim 10, wherein the playing field comprises a roulette wheel rotatably journalled about an axis at a roulette table and/or at a circumferential ball track, wherein the bet displayer is fastened to the roulette wheel.

13. The device of claim 1, wherein a screen for the representation of the game field is provided which is made as a touch screen apparatus into which the aforesaid detection apparatus is integrated.

14. The device of claim 1, wherein the game field is arranged on a table and/or forms a table surface, and wherein the detection apparatus is integrated into the table and/or table surface.

15. The device of claim 1, further comprising a screen for the representation of the playing field, and wherein the bet displayer is integrated with the screen.

16. The device of claim 15, wherein the playing field comprises a roulette wheel rotatably journalled about an axis at a roulette table and/or at a circumferential ball track, wherein the bet displayer is fastened to the roulette wheel.

17. The device of claim 1, wherein the playing field comprises a roulette wheel rotatably journalled about an axis at a roulette table and/or at a circumferential ball track, wherein the bet displayer is fastened to the roulette wheel.

18. The device of claim 17, wherein the axis is upright.

19. An entertainment device comprising:

a game field comprising a plurality of wager fields and a playing field, wherein the wager fields are configured to be covered as an individual wager field and/or group of wager fields by a bet of a player or of a plurality of players, and wherein the playing field comprises a plurality of winning fields displayed as screen representations;

a self-illuminating bet displayer configured to illuminate at least one winning field in response to a detection apparatus detecting a wager field covered by a bet;

the detection apparatus for the detection and generation of a signal representative of the wager field and/or group of wager fields covered by a bet; and a control apparatus for the control of the bet displayer in dependence on the signal of the detection apparatus.

20. An entertainment device comprising:

a game field comprising a plurality of wager fields and a playing field, wherein the wager fields are configured to be covered as an individual wager field and/or group of wager fields by a bet of a player or of a plurality of players, and wherein the playing field comprises a plurality of winning fields;

a self-illuminating bet displayer configured to illuminate at least one winning field in response to the detection apparatus detecting a wager field covered by a bet of the playing field, wherein the bet displayer comprises mechanically movable markings configured to be moved from a non-marking position to a marking position and vice versa in response to a detection apparatus detecting a wager field covered by a bet;

the detection apparatus for the detection and generation of a signal representative of the individual wager field and/or group of wager fields covered by a bet; and a control apparatus for the control of the bet displayer in dependence on the signal of the detection apparatus.

* * * * *